US007035995B2

United States Patent
Henry et al.

(10) Patent No.: US 7,035,995 B2
(45) Date of Patent: Apr. 25, 2006

(54) METHOD AND APPARATUS FOR PERFORMING A HIGH SPEED BINARY SEARCH IN TIME CRITICAL ENVIRONMENTS

(75) Inventors: Russell J. Henry, Wichita, KS (US);
Bret S. Weber, Wichita, KS (US);
Dennis E. Gates, Wichita, KS (US);
John R. Kloeppner, Buhler, KS (US);
Keith William Holt, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 390 days.

(21) Appl. No.: 10/316,339

(22) Filed: Dec. 11, 2002

(65) Prior Publication Data

US 2004/0117596 A1 Jun. 17, 2004

(51) Int. Cl.
*G06F 12/00* (2006.01)
(52) U.S. Cl. .................... 711/221; 711/202; 711/219
(58) Field of Classification Search ............. 711/221, 711/219, 202
See application file for complete search history.

(56) References Cited

U.S. PATENT DOCUMENTS

| 5,463,777 | A | * | 10/1995 | Bialkowski et al. | 707/102 |
| 5,574,910 | A | * | 11/1996 | Bialkowski et al. | 707/1 |
| 5,796,944 | A | * | 8/1998 | Hill et al. | 709/250 |
| 5,860,079 | A | * | 1/1999 | Smith et al. | 713/100 |
| 5,893,137 | A | * | 4/1999 | Parks et al. | 711/108 |
| 6,952,425 | B1 | * | 10/2005 | Nelson | 370/429 |
| 2002/0133623 | A1 | * | 9/2002 | Lin et al. | 709/242 |
| 2003/0009453 | A1 | * | 1/2003 | Basso et al. | 707/3 |

OTHER PUBLICATIONS

Yazdani et al., "Fast and Scalable schemes for the IP address Lookup Problem," pp. 83-92, IEEE, Jun. 29, 2000.*

* cited by examiner

*Primary Examiner*—Stephen C. Elmore
(74) *Attorney, Agent, or Firm*—Yee & Associates, P.C.

(57) ABSTRACT

A hardware assisted searching mechanism is provided that offloads the processor from searching operations. In a preferred embodiment, the hardware assisted searching mechanism performs a binary search of an associated 32 bit register against a binary search table that is set up by the firmware of the storage system. From this binary search table, an index into other structures stored in firmware is obtained that may be used to identify a target device. For example, when a search is to be performed due to receipt of an I/O operation, the firmware, i.e. software instructions stored in the persistent memory chip that are executed by the system processor, writes a 32 bit value to a hardware register that is used by the hardware assisted searching mechanism of the present invention. The hardware assisted searching mechanism performs a binary search of a binary search table based on the contents of the hardware register and returns an index of the entry in another hardware register. This index is then used to index into a storage device mapping structure stored in the firmware that are indexed in the same manner as the binary search table. The index provides a starting point in the storage device mapping structure and from this starting point, the logical unit number is used to identify a particular storage array and logical unit number for the destination of the I/O operation.

22 Claims, 6 Drawing Sheets

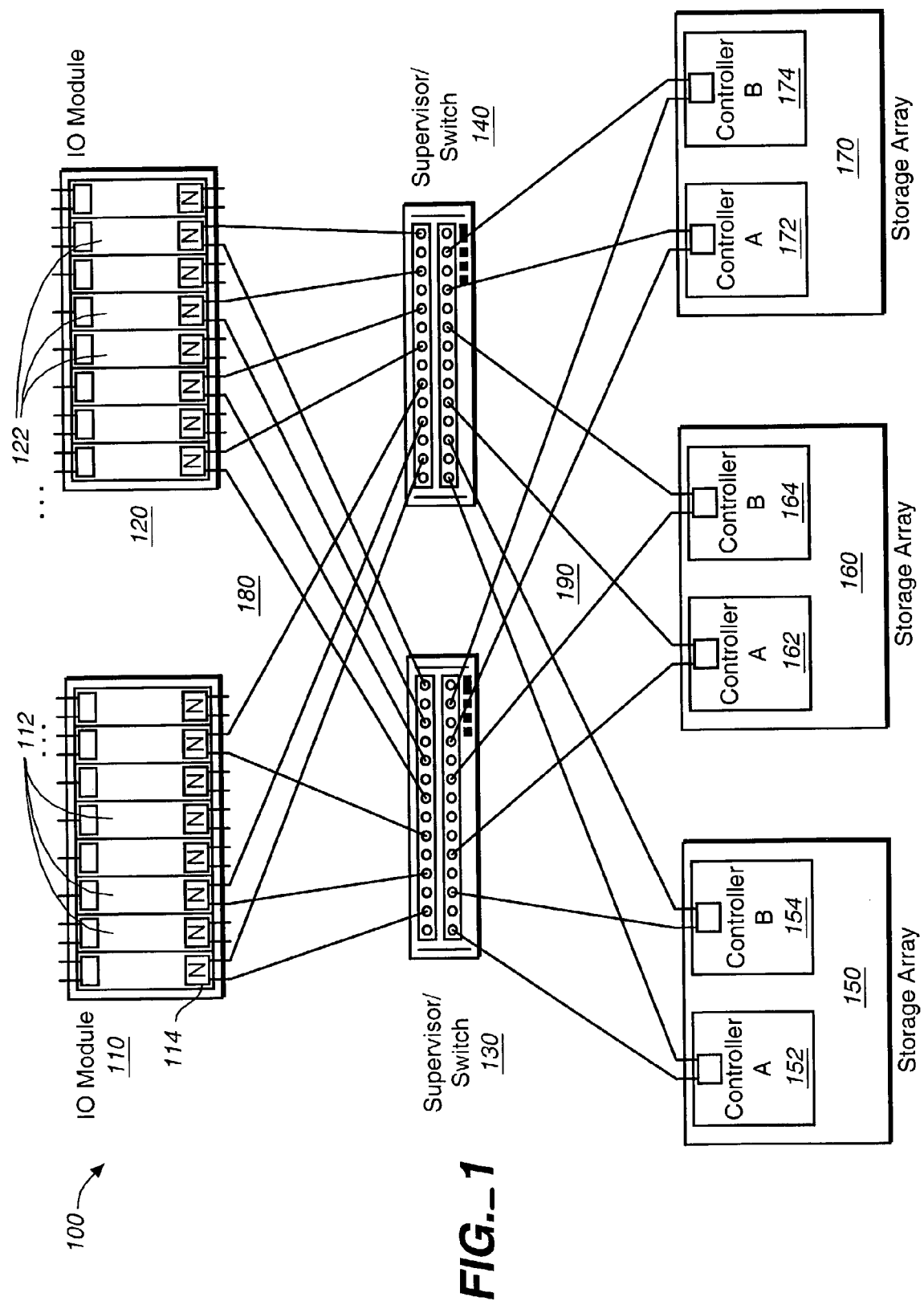
FIG._1

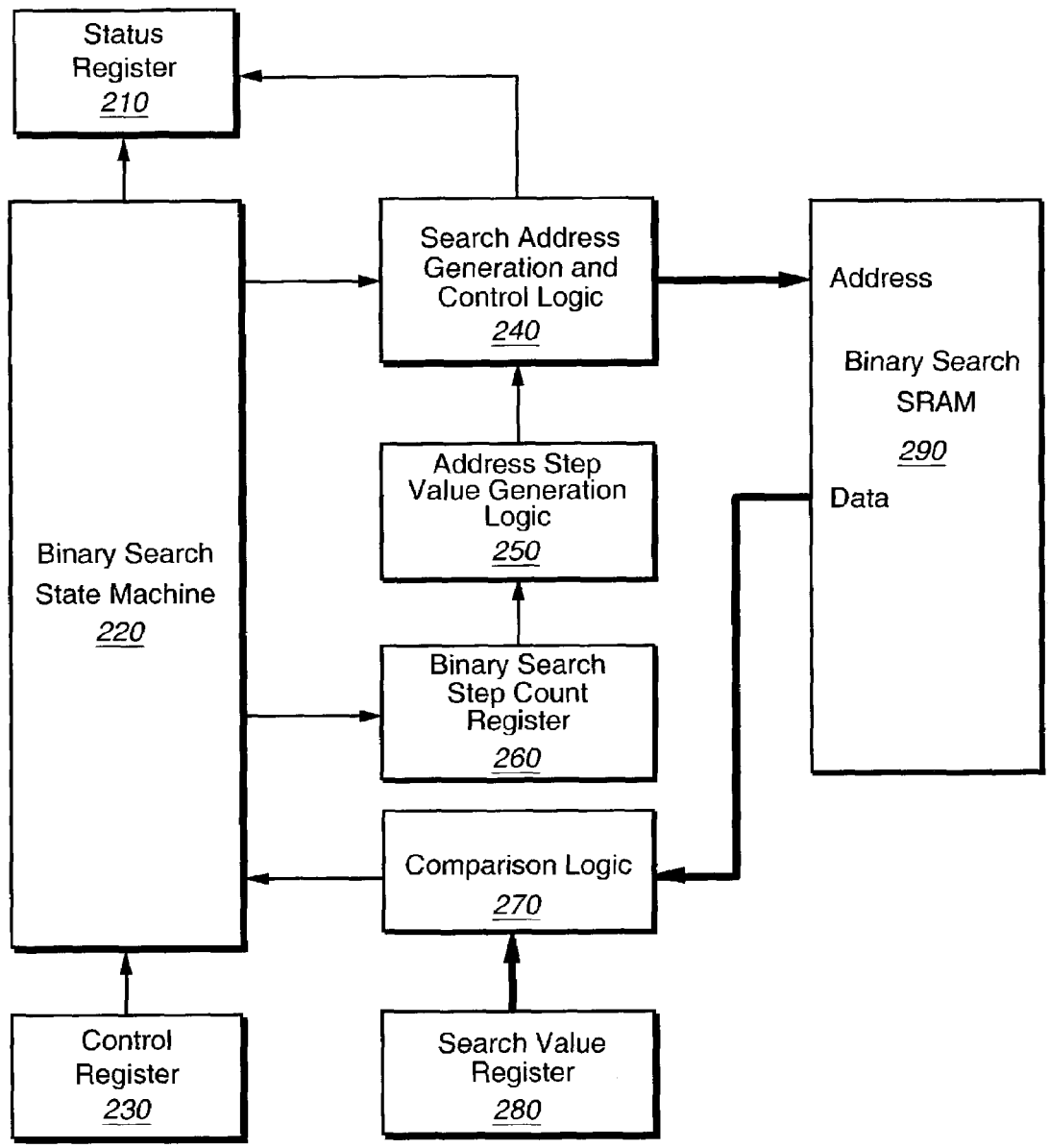
FIG._2

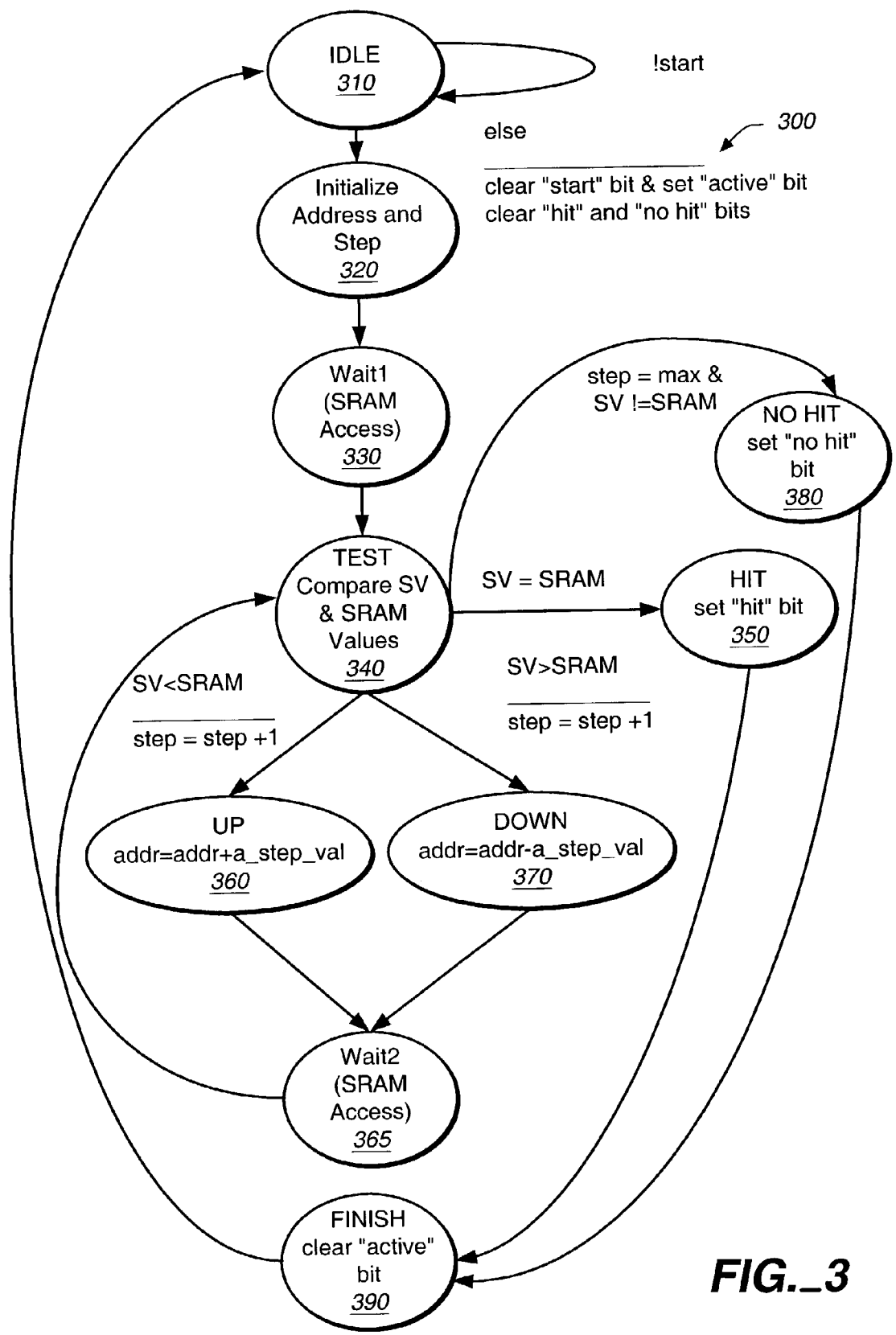
FIG._3

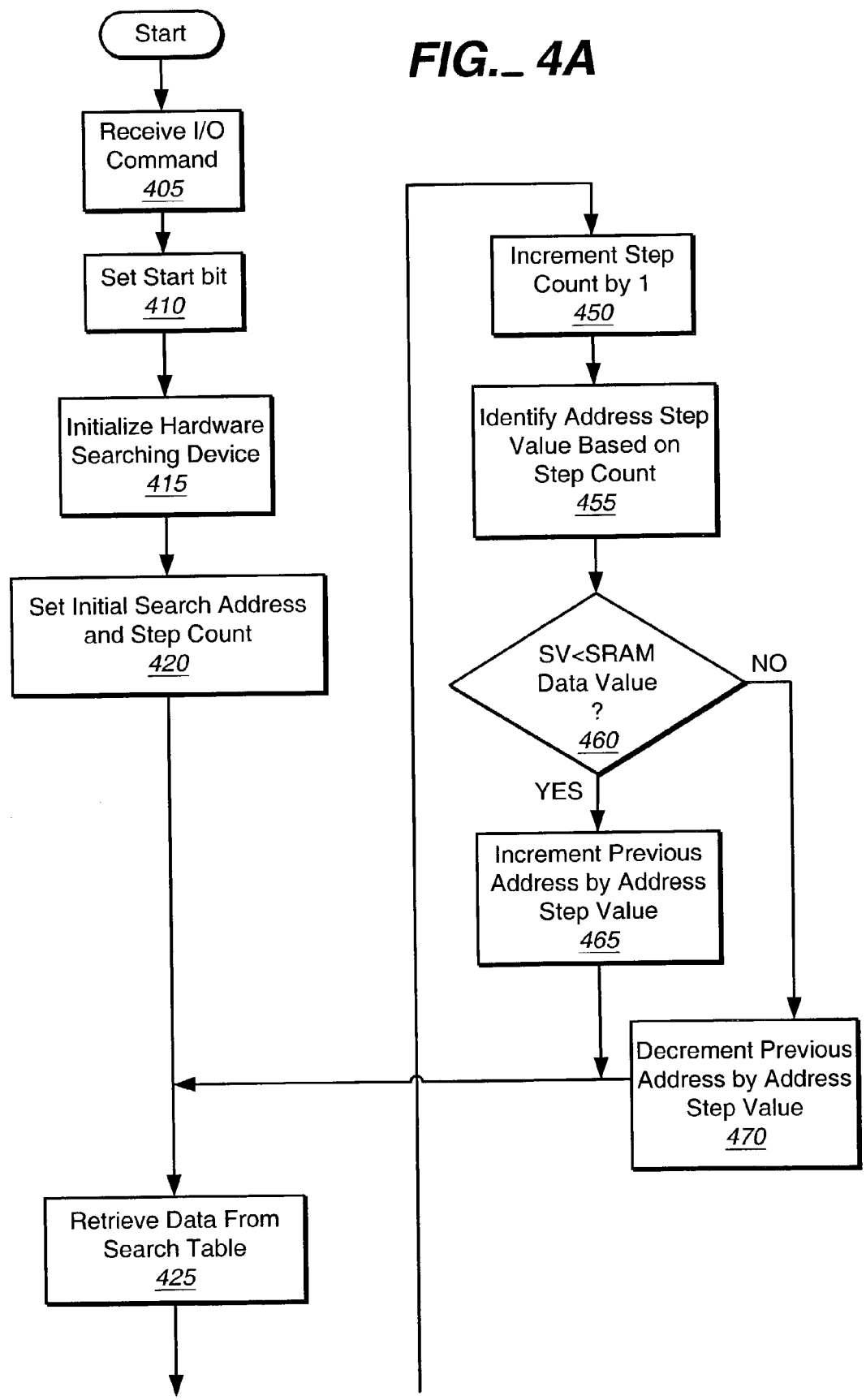
FIG._ 4A

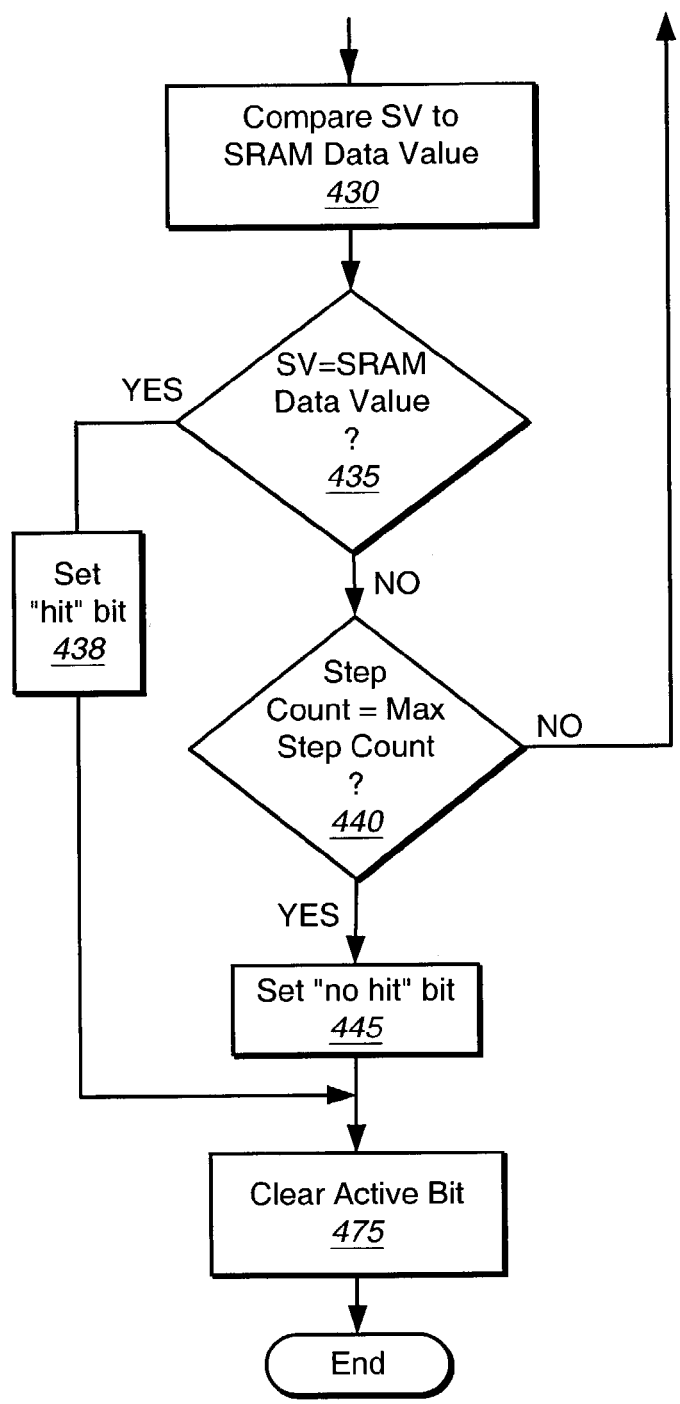
FIG._4B
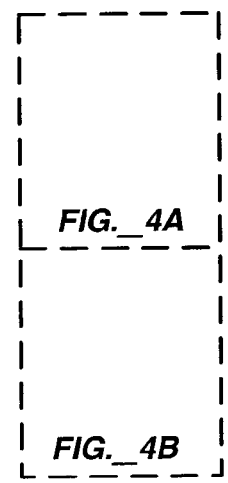
FIG._4

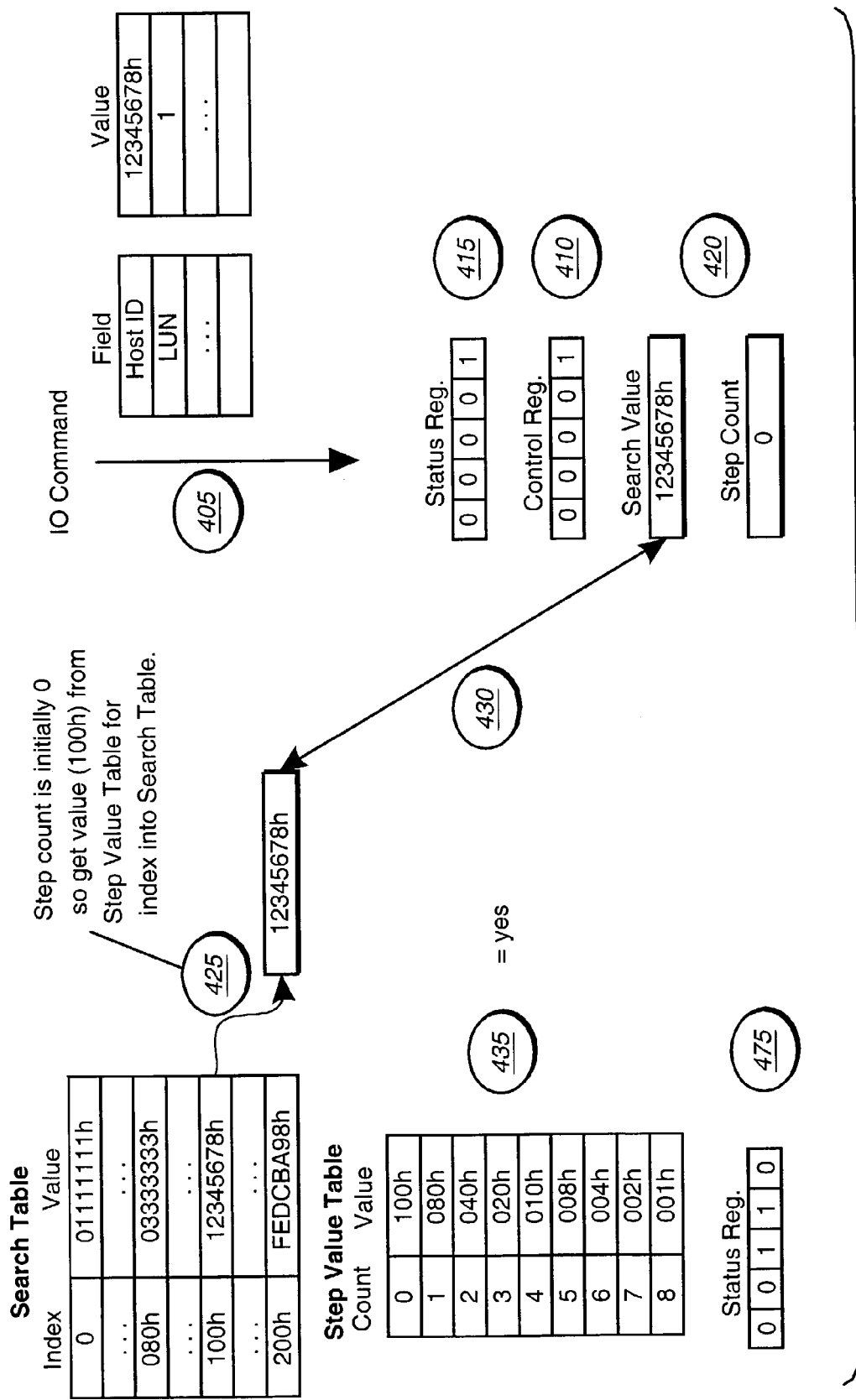
FIG._5

METHOD AND APPARATUS FOR PERFORMING A HIGH SPEED BINARY SEARCH IN TIME CRITICAL ENVIRONMENTS

BACKGROUND OF THE INVENTION

1. Technical Field

The present invention is directed generally toward a method and apparatus for performing high speed searches in time critical environments. More specifically, the present invention is directed to a hardware device for performing searches of input/output addresses which shifts the burden of such searches from the processor to the hardware device.

2. Description of the Related Art

In known systems, when an input/output (I/O) command is received from a host computing system, the storage system must figure out to which entity, e.g., a set of storage device drives in a stand alone storage array or a storage array in a storage complex, the I/O command is directed. Typically, the known approach is to have a firmware device with stored software instructions that are used by the processor of the storage system to perform a search in structures or lists to identify the destination of the command.

Firmware is a category of memory chips that hold their content without electrical power, such as a ROM, PROM, EPROM or EEPROM. Software instructions may be stored in such memory chips such that the software instructions need not be reloaded into the storage device each time they are needed. The software instructions stored in such firmware becomes "hard software" in that the software instruction contents of the memory chips are not lost when electrical power is discontinued.

As noted above, since the firmware acts as simply a persistent storage device, the software instructions stored therein must be executed by the processor of the storage system. Such processing to perform searches consumes processing cycles and tends to be a processor intensive operation. In time critical environments, such as in an I/O module, this searching approach can be too expensive with regard to performance of the storage system.

Thus, it would be beneficial to have an apparatus and method for performing high speed searches in time critical environments which offloads the processing burden of performing such searches from the processor.

SUMMARY OF THE INVENTION

The present invention provides a hardware assisted searching mechanism that offloads the processor from searching operations. In a preferred embodiment, the hardware assisted searching mechanism performs a binary search of an associated 32 bit register against a binary search table that is set up by the firmware of the storage system. From this binary search table, an index into other structures stored in firmware is obtained that may be used to identify a target device.

For example, when a search is to be performed due to receipt of an I/O operation, the firmware, i.e. software instructions stored in the persistent memory chip that are executed by the system processor, writes a 32 bit value to a hardware register that is used by the hardware assisted searching mechanism of the present invention. The hardware assisted searching mechanism performs a binary search of a binary search table based on the contents of the hardware register and returns an index of the entry in another hardware register. This index is then used to index into a storage device mapping structure stored in the firmware that are indexed in the same manner as the binary search table. The index provides a starting point in the storage device mapping structure and from this starting point, the logical unit number and host identifier are used to identify a particular storage array and logical unit number for the destination of the I/O operation.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1 is an exemplary diagram illustrating a portion of a storage system in which the present may be implemented;

FIG. 2 is an exemplary block diagram of one embodiment of a hardware assisted searching mechanism according to the present invention;

FIG. 3 is an exemplary state diagram according to one embodiment of the present invention;

FIG. 4 is a flowchart outlining an exemplary operation of the present invention; and FIG. 4A is a flowchart outlining an exemplary operation of the present invention.

FIG. 4B is a flowchart outlining an exemplary operation of the present invention.

FIG. 5 illustrates an example implementation of the present invention with regard to an exemplary binary search table and address step value table.

DETAILED DESCRIPTION

The description of the preferred embodiment of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention the practical application to enable others of ordinary skill in the art to understand the invention for various embodiments with various modifications as are suited to the particular use contemplated.

With reference now to the figures and in particular with reference to FIG. 1, an exemplary diagram of a portion of a storage system is provided in which the present invention maybe implemented. As shown in FIG. 1, the storage system 100 includes I/O modules 110 and 120, switches 130 and 140, and storage arrays 150–170. The I/O modules 110 and 120 are coupled to the switches 130 and 140 via communication links 180 and the switches 130 and 140 are coupled to the storage building blocks 150–170 via communication links 190.

The I/O modules 110 and 120 include network interface cards 112 and 122 that are equipped with hardware chips 114 and 124 that include a hardware assisted searching mechanism according to the present invention. The storage arrays 150–170 include controllers 152–154, 162–164 and 172–174 that have network interfaces 156–158, 166–168 and 176–178 for communicating via switches 130–140.

When an I/O command is sent to the storage system 100, the I/O command is received from a host system (not shown) via one of the network interface cards 112, 122. The I/O command has associated with it a destination address (which may be a physical or virtual address), a logical unit number (LUN) used to identify a particular destination device, and a host identifier that identifies the source of the I/O command. Upon receipt of the I/O command, the firmware of the I/O module 110, for example, writes the destination address included in the I/O command into a hardware register associated with a hardware chip, such as hardware chip 114. The hardware chip 114 performs a search, which in a preferred embodiment is a binary search, on a stored binary search table based on this destination address stored in the hardware register, to thereby obtain an index. The hardware chip 114 then returns this index to the firmware which indexes into a storage device mapping data structure and the LUN is used to identify a particular physical device to which the I/O command is directed. Thereafter, the I/O command is reformatted with routing information for routing the I/O command to the proper controller 152–154, 162–164 or 172–174 in a target storage building block 150, 160 or 170 and LUN identified using the hardware chip mechanisms discussed above.

FIG. 2 is an exemplary block diagram of a hardware mechanism for performing a search according to the present invention. The particular embodiment shown in FIG. 2 is for a binary search hardware mechanism. A binary search is a technique for quickly locating an item in a sequential list comparing a value to a value in the middle of the list. If the values do not match, a determination is made as to whether an upper half or a lower half of the list is more likely to include the value. The value is then compared to a value in the middle of the upper half or lower half and the process is repeated until a matching value is located or a small enough group is isolated to be sequentially searched.

The present invention, however, is not limited to binary searches. Rather, similar hardware structures may be used to perform other types of searches including but not limited to linear searches. These other types of searches may be performed in dedicated hardware devices similar to that depicted in FIG. 2 with minor modifications to the structure. The key principle, however, is to offload the processing burden of performing such searches from the system processor to a dedicated hardware device that performs these searches and thereby increases the overall throughput and responsiveness of the system.

Returning to FIG. 2, as illustrated, the depicted exemplary embodiment of the hardware searching device of the present invention includes a status register 210, a binary search state machine 220, a control register 230, a search address generation and control logic module 240, an address step value generation logic module 250, a binary search step count register 260, a comparison logic module 270, a search value register 280, and a binary search static random access memory (SRAM) 290. The status register 210 contains status bits which can be sampled by the firmware of the storage system that is making use of the hardware searching device. These status bits may include an active bit, a hit bit, and search address bits, for example. The active bit indicates that the hardware searching device is in an active state of performing a search, the hit bit indicates whether a search address is found in a stored data structure, and the search address bits identifies the address being searched. The status register 210 is written to by the search address generation and control logic module 240 as changes in status occur.

The binary search state machine 220 is a control state machine that controls all of the hardware blocks illustrated in FIG. 2 that are involved in the binary search operation. The binary search state machine 220 operates in accordance with a state machine, such as that illustrated in FIG. 3 and discussed hereafter, and issues commands to the other hardware blocks to implement the necessary functions for performing the binary search according to the present invention.

The control register 230 is a firmware controlled register used to initiate a binary search. For example, a program on a host computing system may send an I/O command to the storage system and in response, the firmware sets the "start" bit that is stored in the control register 230 indicating start of a binary search to identify the destination of the I/O command. In this way, the firmware of the storage system may initiate a binary search for the destination address of the target device of the I/O command.

The search address generation and control logic module 240 generates an address of data to be retrieved from the binary search SRAM 290 based on control information sent to it from the binary search state machine module 220. That is, the binary search state machine 220 sends commands to the search address generation and control logic module 240 to load and address, add a step value to the previously loaded address, or subtract a step value from the previously loaded address, in accordance with the state machine states, discussed in more detail hereafter.

The binary search step count register 260 and address step value generation logic 250 are used to generate the step value that is to be added to or subtracted from the previously loaded address value by the search address generation and control logic module 240. The binary search step count register 260 is used to store an index value into an address step value table stored by the address step value generation logic module 250. The value stored in the binary search step count register 260 is incremented based on commands received from the binary search state machine module 220. The address step value generation logic 250 generates an address step value based on the index into the address step value table stored in the binary search step count register 260. The address step value is then used by the search address generation and control logic 240 to either add or subtract the address step value to or from the previously loaded address based on commands received from the binary search state machine module 220.

The search address generated by the search address generation and control logic module 240 is provided to the binary search SRAM 290 which outputs data stored at the designated address in the SRAM 290. The data from the SRAM 290 is output to the comparison logic module 270 which compares the data received from the SRAM 290 with a search value stored in the search value register 280. The firmware of the storage system writes the address received in the I/O command from the host system into this search value register 280 and thus, the address in the I/O command is compared against address data stored in data structures within the binary search SRAM 290. Based on the comparison performed by the comparison logic 270, results are sent back to the binary search state machine 220 which then transitions from one state to another based on the received results, as discussed hereafter.

FIG. 3 is an exemplary diagram illustrating a state machine according to one exemplary embodiment of the present invention in which a binary search is performed. As shown in FIG. 3, and with continued reference to FIG. 2, the state machine 300 has state transitions that start from an idle state 310. That is, the hardware searching device remains in an idle state until a start bit is set, such as the start bit in the control register 230. The start bit may be set in response to the storage system receiving an I/O command for which a search needs to be conducted to identify the destination device to which the I/O command should be forwarded. The firmware of the storage system sets the start bit in the control register 230 and also writes the address of the destination from the I/O command in the search value register 280.

If the start bit is set, the state machine transitions to the initialize state 320 in which the search address in the SRAM is initialized to an initial value corresponding to a first value in an address step value table of the address step value generation logic module 250. In addition the step count is initialized to 0, hit and no hit bits are cleared, the start bit is cleared and an active bit is set in the status register 210. The state machine then transitions to a first wait state 330, WAIT1, where the state machine waits for the SRAM to be accessed and the data at the search address is retrieved.

The binary search table stored in the SRAM 290 is a listing of indices and corresponding I/O addresses. This binary search table is set up by the firmware of the storage system and is organized in descending order of address value. The indexes in the binary search table are consistent with other I/O data structures maintained by the storage system for identifying destination addresses. Thus, by finding an index in the binary search table corresponding to an I/O address in the I/O command, the index may be used with other data structures to identify the exact storage device to which the I/O command should be routed.

An example of a binary search table is provided below in Table 1. While the present invention is described in terms of a binary search table having a descending order, it should be apparent to those of ordinary skill in the art that any other organization of entries in the binary search table may be used so long as that organization is reflected in the functionality of the mechanisms in the hardware searching device.

TABLE 1

Example Binary Search Table

| Index | Value |
|---|---|
| 0 | 0x12345678 |
| 1 | 0x23456789 |
| 2 | ... |
| 3 | ... |
| ... | ... |
| ... | ... |
| 3fff | 0xfedcba98 |

Once the data at the search address is retrieved, the state machine transitions to a test state 340 in which the address from the I/O command, i.e. the search value (SV) is compared to the data retrieved from the SRAM. Based on the results of the comparison, the state machine transitions to one of four states. If the results of the comparison is that there is a hit, i.e. SV equals the SRAM data value retrieved, then the state machine transitions to hit state 350. If the result of the comparison is that SV is less than the SRAM data value, then the step count is incremented and the state machine transitions to an up state 360. If the result of the comparison is that SV is greater than the SRAM data value, then the step count is incremented and the state machine transitions to a down state 370. If the step count is a maximum value and SV is not equal to the SRAM data value, then the state machine transitions to a no hit state 380.

In the hit state 350, the hit bit is set and the state machine transitions to a finish state 390 where the active bit is cleared in the status register 210. The index corresponding to the entry in the SRAM binary search table is returned to the storage system firmware which then uses this index value to index into a storage device mapping data structure. The index provides a starting point at which the firmware then uses the LUN in the I/O command to identify first a particular storage array and then a particular storage device within the storage array to which the I/O command is to be routed. The firmware of the I/O module then sends the I/O command to the supervisor/switch with the appropriate routing information for routing the I/O command to the correct destination storage array and device.

In the up state 360 and down state 370, the address is incremented and decremented, respectively, by an address step value corresponding to the current step count. That is, the step count is used to index into an address step value table stored in the address step value generation logic module 250, to retrieve an address step value that is then added to or subtracted from the previously loaded address. An example of an address step value table according to this exemplary embodiment is provided below in Table 2.

TABLE 2

Example Address Step Value Table

| Step Count | Address Step Value (a_step_val) |
|---|---|
| 0 | 800 h |
| 1 | 400 h |
| 2 | 200 h |
| 3 | 100 h |
| 4 | 080 h |
| 5 | 040 h |
| 6 | 020 h |
| 7 | 010 h |
| 8 | 008 h |
| 9 | 004 h |
| a | 002 h |
| b | 001 h |

The state then transitions to a second wait state 365 in order to wait for the SRAM to load the new address into the comparison logic module 270. The state machine then transitions to the test state 340 again and the process continues.

In the no hit state 380, the address in the I/O command is determined to not be a valid address and the no hi bit is set in the status register 210. The state machine then transitions to the finish state 290 where the active bit in the status register 210 is cleared. The firmware of the I/O module may then perform appropriate error processing based on the fact that the no hit bit is set in the status register.

FIG. 4, which is composed of FIG. 4A, and FIG. 4B is a flowchart outlining an exemplary operation of the present invention. As shown in FIG. 4, the operation starts with receiving an I/O command in an I/O module of a storage system (step 405). A start bit is set in the control register of the hardware searching device by the firmware of the I/O module (step 410). The hardware searching device reads the start bit and, in response to the start bit having been set, initializes the binary searching device by clearing the start bit, setting the active bit in the status register, and clearing the hit and no hit bits of the status register (step 415). The initial search address is set to an initial value corresponding to a "0" entry in the address step value table and the step count is initialized to 0 (step 420).

The binary search device then retrieves data corresponding to the search address from the binary search table in the binary search SRAM (step 425) and compares the retrieved search address to the search value, i.e. the address in the received I/O command (step 430). A determination is then made as to whether the search value (SV) equals the SRAM data value from the binary search table (step 435). If so, the operation sets a "hit" bit (step 438) and continues to step 475. If the SV does not equal the SRAM data value, then a determination is made as to whether the step count equals a maximum step count (step 440). If so, then a "no hit" bit is set (step 445) and the operation continues to step 475.

If the SV does not equal the SRAM data value and the step count does not equal a maximum step count, then the step count is incremented by 1 (step 450). An address step value corresponding to the new step count is then identified from an address step value table (step 455). A determination is then made as to whether the SV is less than the SRAM data value (step 460). If so, then the previously loaded address is incremented by an address step value (step 465). If not, then the previously loaded address is decremented by the address step value (step 470). The operation then returns to step 425.

If the SV equals the SRAM data value or if there is no hit, the operation continues to step 475 where the active bit is cleared and control is returned to the firmware of the I/O module. The operation then ends.

Since the status register stores the hit, no hit, search address, and active bits, the firmware may access the status register to identify if there was a hit and the corresponding search address, or if there was no hit and thus, the I/O command address is invalid. The firmware may then use the search address to identify a corresponding index into a storage device mapping table, from the binary search table. This index may then be used by the firmware along with a logical unit number to identify a storage array and storage device within the storage array to which the I/O command is to be routed. This information may then be provided to a switch or supervisory device along with the I/O command to thereby route the I/O command to the appropriate destination or target storage device.

FIG. 5 illustrates an example implementation of the present invention with regard to an exemplary binary search table and address step value table. Steps of the implementation corresponding to those in the flowchart of FIG. 4 are illustrated with similar reference numbers to their corresponding steps in FIG. 4.

As shown in FIG. 5, an I/O command is received having an associated field and value for the host identifier and LUN (405). A start bit is set in the control register (410) and the status register is initialized (415). The search value is set to a value received in the I/O command ("12345678h") and the step count is set to 0 (420). The value corresponding to the step value is then retrieved from the search table (425) and is compared with the search value (430). A determination that the search value matches the value retrieved from the search table is made (435). The status register is updated and control is then returned to the firmware of the I/O module (475).

Thus, the present invention provides a dedicated hardware device that is capable of performing high speed searches to identify destination addresses for storage devices associated with an I/O command. The dedicated hardware device according to the present invention provides a mechanism that offloads the burden of performing such searches from the system processor and thereby increases the responsiveness and throughput of the storage system.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system having a processor, of routing an I/O command to a destination storage device, comprising:
    receiving the I/O command having a fist destination address;
    providing the first destination address to a dedicated hardware searching device that is external to the processor;
    performing a search of a first data structure using the dedicated hardware searching device to identify an index; and
    using the index to route the I/O command to the destination storage device.

2. The method of claim 1, wherein the index is used with a second data structure to identify a second destination address different from the first destination address, and wherein the I/O command is routed to the destination storage device based on the second destination address.

3. The method of claim 1, wherein the method is performed in an I/O module of a storage system.

4. The method of claim 1, wherein the search is a binary search.

5. The method of claim 1, wherein providing the first destination address to the dedicated hardware searching device includes writing the first destination address to a hardware register associated with the hardware searching device.

6. The method of claim 1, wherein performing a search of the first data structure includes:
    retrieving a candidate address from the first data structure;
    comparing the candidate address to the first destination address; and
    outputting an index associated with the candidate address if the comparison indicates a match between the candidate address and the first destination address.

7. The method of claim 6, wherein retrieving the candidate address from the first data structure includes:
    identifying a current step count;
    identifying a current step amount by indexing into a step amount table data structure based on the current step count; and
    retrieving an entry at a position in the first data structure corresponding to the current step amount identified from the step amount table data structure.

8. The method of claim 1, wherein the search is performed based on a state machine.

9. The method of claim 8, wherein performing a search of the first data structure includes:
    transitioning to a test state in the state machine where a comparison of the first destination address to an address retrieved from the first data structure is performed; and
    transitioning to one of a plurality of states in the state machine based on results of the comparison.

10. The method of claim 9, wherein the plurality of states include at least one of a no bit state in which no address in the first data structure matches the first destination address, a hit state in which the address retrieved from the first data structure matches the first destination address, an up state in which a step amount for indexing into the first data structure a increased, sad a down state in which a step amount for indexing into the first data structure is decreased.

11. An apparatus for routing an I/O command to a destination storage device, said apparatus including a processor and said apparatus comprising:
- means for receiving the I/O command having a first destination address;
- means for providing the first destination address to a dedicated hardware searching device that is external to the processor;
- means for performing a search of a first data structure using the dedicated hardware searching device to identify an index; and
- means for using the index to route the I/O command to the destination storage device.

12. The apparatus of claim 11, wherein the index is used with a second data structure to identify a second destination address, different from the first destination address, and wherein the I/O command is routed to the destination storage device based on the second destination address.

13. The apparatus of claim 11, wherein the apparatus is part of an I/O module of a storage system.

14. The apparatus of claim 11, wherein the search is a binary search.

15. The apparatus of claim 11, wherein the means for providing the first destination address to the dedicated hardware searching device includes means for writing the first destination address to a hardware register associated with the hardware searching device.

16. The apparatus of claim 11, wherein the means for performing a search of the first data structure includes:
- means for retrieving a candidate address from the first data structure;
- means for comparing the candidate address to the first destination address; and
- means for outputting an index associated with the candidate address if the comparison indicates a match between the candidate address and the first destination address.

17. The apparatus of claim 16, wherein the means for retrieving the candidate address from the first data structure includes:
- means for identifying a current step count;
- means for identifying a current step amount by indexing into a step amount table data structure based on the current step count; and
- means for retrieving an entry at a position in the first data structure corresponding to the current step amount identified from the step amount table data structure.

18. The apparatus of claim 11, wherein when a search is performed, the search is performed based on a state machine.

19. The apparatus of claim 18, wherein the means for performing a search of the first data structure includes:
- means for transitioning to a test state in the state machine where a comparison of the first destination address to an address retrieved from the first data structure is performed and
- means for transitioning to one of a plurality of states in the state machine based on results of the comparison.

20. The apparatus of claim 19, wherein the plurality of states include at least one of a no hit state in which no address in the first data structure watches the first destination address, a lilt state in which the address retrieved from the first data structure matches the first destination address, an up state in which a step amount for indexing into the first data structure is increased, and a down state in which a step amount for indexing into the first data structure is decreased.

21. An apparatus for performing a search of a data structure to identify a destination address of a storage device, comprising:
- a storage module for storing the data structure;
- at least one address identification logic module for identifying data to be retrieved from an address in the data structure;
- a comparison logic module for comparing data retrieved from the data structure with a search value; and
- a search stale machine module operable to issue commands to identify the destination address of the storage device to the at least one address identification logic module based on results received from the comparison logic module in accordance with a state machine with the search state machine module.

22. A computer program product comprising:
- a computer usable medium including computer usable program code for routing an I/O commend to a destination storage device; said computer usable medium operably connected to a processor, and said computer program product including; computer usable program coda for receiving the I/O command having a first destination address;
- computer usable program code for providing ti first destination address to a dedicated hardware searching device that is external to the processor;
- computer usable program code for performing a search of a first data structure using the dedicated hardware searching device to identify an index; and
- computer usable program code for using the index to route the I/O command to the destination storage device.

* * * * *